July 31, 1934. J. C. CURTIS 1,968,375

THROTTLE VALVE AND MOTIVE FLUID CONNECTION FOR ROCK DRILLS

Filed Sept. 26, 1931

JOHN C. CURTIS
INVENTOR

BY John E. Reufer
ATTORNEY

Patented July 31, 1934

1,968,375

UNITED STATES PATENT OFFICE 1,968,375

THROTTLE VALVE AND MOTIVE FLUID CONNECTION FOR ROCK DRILLS

John C. Curtis, Cleveland, Ohio, assignor to The Cleveland Rock Drill Company, Cleveland, Ohio, a corporation of Ohio Application September 26, 1931, Serial No. 565,327

2 Claims. (Cl. 251—164)

This invention relates to rock drills in general but more particularly to throttle valve and motive fluid connection for rock drills of the fluid actuated type.

One object of this invention is to provide a rock drill with a throttle valve formed with an integral handle thus overcoming the difficulty of securing said handle on said valve due to the vibratory impulse imparted upon said parts which has the tendency to loosen the bolt or pin usually used in the assembly of suich a construction.

Another object of this invention is to allow the removal or replacement of such a throttle. With an integral handle necessarily bent to afford sufficient leverage to rotate the valve, it was previously impossible to remove the valve from its seat without straightening the handle and frequently imparting serious injuries to the valve. Furthermore, the bending of the handle had necessarily to take place only after the throttle valve was assembled within its seat. This operation proved to be cumbersome and expensive. It is therefore an object of this invention to provide a throttle valve with an integral handle which can be bent before assembly, facilitating therefore the bending operation as well as reducing the assembling cost.

Other objects and advantages more or less ancillary to the foregoing and the manner in which the various objects are attained, reside in the specific construction and aggroupment of the elements peculiar to this structure, as will become apparent from a more complete examination of this specification, in the claims of which there are assembled certain specific combinations of parts and specific constructions indicative of the scope and spirit of the invention.

In the drawing which illustrates a preferred embodiment of the invention.

Figure 1:
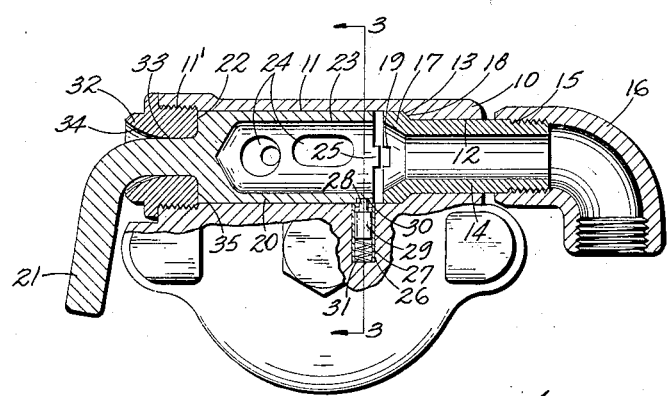
Fig. 1 is an elevational view of the backhead of a rock drill, partly in section illustrating the invention.
Figure 2:
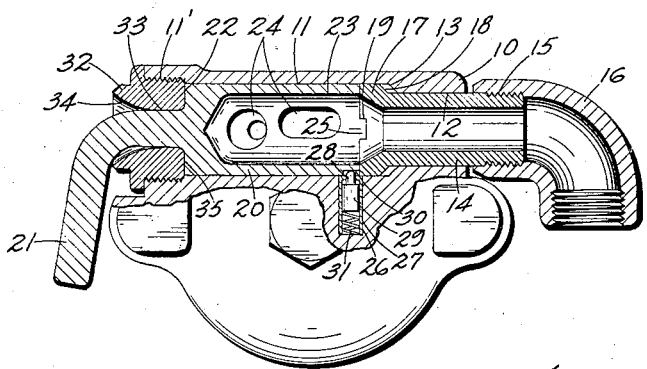
Fig. 2 is a view similar to Fig. 1 but with some parts shown in different positions.
Figure 3:
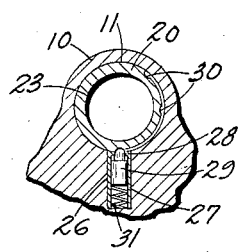
Fig. 3 is a cross sectional view taken on a plan indicated by line 3—3 in Fig. 1.

Referring to the drawing in which like symbols designate corresponding parts throughout the several views, there is shown a backhead 10 having transversely disposed bores 11 and 12, forming at their intersection an inclined shoulder or seat 13, and being terminated at one end by a screw threaded portion 11'.

Rotatably mounted within the bore 12, there is an inlet tubular member 14 terminated by a screw threaded portion 15. The other end of the member 14 is provided with an enlarged cylindrical portion or head 17 formed with an inclined wall 18 which is similar to the wall 13 and is capable of fluid tight engagement therewith. Radially disposed on the vertical end wall of the head 17, there are a plurality of slots 19, the purpose of which will be explained later.

Rotatably mounted within the bore 11 but in fluid tight engagement therewith, there is a throttle valve 20 provided with an integral bent handle 21 of smaller diameter than the valve 20 and forming at their intersection an annular wall or seat 22. The throttle valve 20 is provided with a cavity or chamber 23 and leading therefrom with a plurality of ports 24.

A plurality of tongues 25 are formed on the annular end wall of the valve 20 and are adapted for engagement with the recesses 19 provided on the end wall of the tubular member 14. However the bore 11 is of sufficient depth to permit the removal of the tongues 25 from their corresponding recesses 19 and allowing thereby the relative rotation of the valve 20 with the tubular member 19.

The backhead is provided with a bore 26 in registration with the throttle valve bore 11. The bore 26 is properly machined to snugly receive a hollow bushing 27 formed with an inwardly projecting flange 28 and capable to slidably receive a plunger 29 which is engageable within a plurality of recesses 30, disposed on the circumferential wall of the throttle valve 20 and is maintained within said recesses by the tension of a compression spring 31.

The throttle valve 20 and its appurtenances are maintained within the bore 11 by a screw threaded nut 32 engageable within the threaded portion 11'. The nut 32 is provided with an orifice 33 enlarged or flared as at 34 to allow the passing of the nut over the valve handle 21 after the handle has been bent.

When motive fluid is admitted within the cavity 23 of the throttle valve 20 by means of the hose connection 16, pressure exerted upon the ends of the member 14 and valve 20, will cause the seating of the inclined wall 18 against its respective seat 13, thus preventing any possible escape of motive fluid between the bore 12 and member 14. The throttle valve face 22 will be forced against its respective seat 35 constituted by the end of the nut 32 preventing thereby any leakage of motive fluid which may occur between the bore 11 and valve 20 to escape to atmosphere.

The throttle valve 20 by the handle 21 can easily be rotated to allow the registration of the ports 24 with their respective passages in the backhead and leading to the different working parts of the machine. The valve will be maintained in any desired position by the engagement of the pressed spring plunger 29 within its corresponding recesses 30 disposed on the circumference of the valve. These recesses are extended up to the outer end of the throttle thus affording the introduction and removal of the throttle valve to and from its seat regardless of the plunger 29.

In the assembling of the device, the member 14 may first be introduced within the bores 11 and 12. Subsequently the throttle valve 20 may be introduced within the bore 11 and be moved rightwardly to allow the engagement of the lugs 25 within their corresponding recesses 19, thus preventing any relative rotation between the throttle valve 20 and the member 14. By maintaining the throttle valve handle 21 against rotation, the hose connection 16 can be screwed over the member 14. It is obvious that instead of providing the tongues 25 at the end of the valve 20, and using the said valve for the locking device of the member 14, a tool of any suitable shape and having lugs similar to lugs 25 could be introduced within the bore 11 and engaged with the nipple 14, thus preventing the rotation of the latter when screwing the hose connection 16.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. A throttle valve comprising a housing, a valve member and a pressure fluid conveying member rotatably secured within said housing and capable of relative rotation, and means on each of said members engageable with each other to prevent said relative rotation, the disengagement of said means being responsive to the action of the pressure fluid on one of said members.

2. A throttle valve comprising a housing, a valve member and a pressure fluid conveying member rotatably secured within said housing and capable of relative rotation, and means on each of said members engageable with each other to prevent said relative rotation, said means being normally maintained out of engagement by the action of the pressure fluid on one of said members.

JOHN C. CURTIS.